United States Patent [19]
Wakamatsu

[11] 3,969,586
[45] July 13, 1976

[54] MULTIPLEX SIGNAL TRANSMISSION DEVICE

[75] Inventor: Hisato Wakamatsu, Kariya, Japan

[73] Assignee: Nippodenso Co., Ltd., Japan

[22] Filed: Apr. 29, 1974

[21] Appl. No.: 465,359

Related U.S. Application Data
[63] Continuation of Ser. No. 246,482, April 21, 1972, abandoned.

[30] Foreign Application Priority Data
Apr. 22, 1971  Japan............................ 46-26376

[52] U.S. Cl. ........................ 179/15 A; 179/15 BS
[51] Int. Cl.² ........................................ H04J 3/04
[58] Field of Search .......... 179/15 A, 15 BS, 15 BL; 178/69.5 R, 53; 340/183, 184, 318

[56]          References Cited
            UNITED STATES PATENTS

| | | | |
|---|---|---|---|
| 2,363,062 | 11/1944 | Hartley............................ | 179/15 A |
| 3,261,918 | 7/1966 | Sisti................................. | 179/15 BS |
| 3,403,377 | 9/1968 | Connolly......................... | 179/15 BS |
| 3,427,475 | 2/1969 | Wilkinson....................... | 179/15 BL |
| 3,575,557 | 4/1971 | McCowen....................... | 179/15 AF |
| 3,581,017 | 5/1971 | Stevens........................... | 179/15 A |
| 3,614,327 | 10/1971 | Low................................. | 179/15 A |
| 3,663,760 | 5/1972 | De Witt........................... | 179/15 AF |
| 3,689,699 | 9/1972 | Brenig............................. | 179/15 BS |

OTHER PUBLICATIONS
Bell Laboratories Record; "Timing Control for PCM", by A. E. Johanson; Jan. 1949; pp. 10–15.
Bell Laboratories Record; "Synchronization for the PCM Receiver" by J. M. Manley; Feb. 1949; pp. 62–66.

*Primary Examiner*—David L. Stewart
*Attorney, Agent, or Firm*—Cushman, Darby & Cushman

[57]          ABSTRACT

A multiplex signal transmission device for use in a multiplex communication system based on a time sharing method, which device comprises a transmitter and a receiver each having a counter circuit respectively for generating address signals in response to timing signals generated by an oscillator. Signals are transmitted from the transmitter to the receiver as a level signal at a time position of the address signal which is allotted to the signal to be transmitted.

9 Claims, 13 Drawing Figures

MULTIPLEX SIGNAL TRANSMISSION DEVICE

This is a continuation of application Ser. No. 246,482 filed Apr. 21, 1972, now abandoned.

BACKGROUND OF THE INVENTION

1. FIELD OF THE INVENTION

The present invention relates to an improvement in the multiplex signal transmission device employing a multiplex communication system based on time-sharing.

2. DESCRIPTION OF THE PRIOR ART

Several circuits used in the conventional multiplex signal transmission device were composed of a variety of digital IC elements the treatment of which were limited to those versed in the field of the art. Therefore, any one who was not a specialist could hardly check and maintain the safety of the circuits. This has prevented the wide-spread use of the device in spite of increasing demands therefor. The rationalized wirings for an automobile or for the concentrated control board of a machine tool, for example, can be constituted with such circuits. In this case, however, the more elaborate is the control, the more necessary are the transmission lines for signals from various detectors, and the greater the number of transmission lines, the more numerous are the causes of faults.

SUMMARY OF THE INVENTION

An object of the present invention is to provide a multiplex signal transmission device the circuit of which is comprised of at most four blocks fabricated independently through integrated circuit techniques so that the treatment of the circuit may be faciliated. The selection of any transmission line is made on the basis of decimalism so that the systematization of the circuit and the maintenance and check thereof may be facilitated, which any one who is not a specialist in electronics can check, and which is free from the drawbacks unavoidable with the conventional circuit so that it can stand the general consumer's demands.

Another object of the present invention is to provide a multiplex signal transmission device comprising: a transmitter comprising a first counting block which generates not only an address signal representing individual addresses according to time sharing by applying a timing pulse signal having a constant frequency to a scale-of-ten counter, but also a synchronous signal to produce a reset signal for a circuit which needs to be reset, and a combining block which transmits a plurality of signals to the receiving end as level signals corresponding to the addresses of the address signal from the first counting block; and a receiver comprising a second counting block which receives the timing pulse signal from the transmitter to generate an address signal representative of individual addreses according to time sharing through a scale-of-10 counter and which receives the synchronous signal from the first counting block of the transmitter to produce a reset signal and a signal for memory transfer, and a restoring block which receives the level signal from the combining block of the transmitter to pick up levels corresponding to the addresses of the address signal of the second counting block and to feed the levels, i.e. addresses, to a first memory circuit and which transfers the content of the first memory circuit to a second memory circuit in response to the transfer signal from the second counter block.

According to the present invention, the first and second counting blocks may be of the same circuit configuration and therefore of the same kind. Thus, the overall circuit of the multiplex signal transmission device according to the invention needs at most four independent blocks having different functions; one for the first and second counting blocks, one for the oscillator to generate a timing signal, and the other two for the combining block and the restoring block. Moreover, in order to generate address signals, scale-of-ten counters are used in both the first and second counting blocks, and in addition to this, the decimalism which is easy to understand is employed for the selection of the address signal. Consequently, the device according to the present invention can be easily checked and treated by those who are not experts in the field of the art concerned if they only use suitable instruments especially designed therefor.

Further, if the oscillator for generating the timing signal is incorporated in the first counting block so as to form a single IC unit, the single unit can be used also as the second counting block where the oscillator part plays no role. In this case, an IC unit fabricated as the second counting block itself and an IC unit which consists of the first counting block and the oscillator and serves also as the second counting block with the oscillator section left unused, are of the same production cost. In this way, the single IC unit can be used for both the transmitter and the receiver. This not only adds to the interchangeability of parts and to the mass-producibility of the device, but also takes from the number of blocks necessary, i.e. from four to three blocks. Therefore, the maintenance and checking of the device will be the more easily facilitated.

Furthermore, there are needed only five lines, i.e. three for timing signal, synchronous signal and level signal and two for power supply, connecting the transmitter with the receiver. In this respect, the present invention is advantageous in that fires liable to be caused due to short-circuiting in entangled wiring can be prevented.

Furthermore, the device according to the present invention has an advantage that when it is used for an automobile or the concentrated control board of a machine tool it can be given additional functions without any additional wiring.

DETAILED DESCRIPTION OF THE PREFERRED EMBODIMENT

Figure 1:
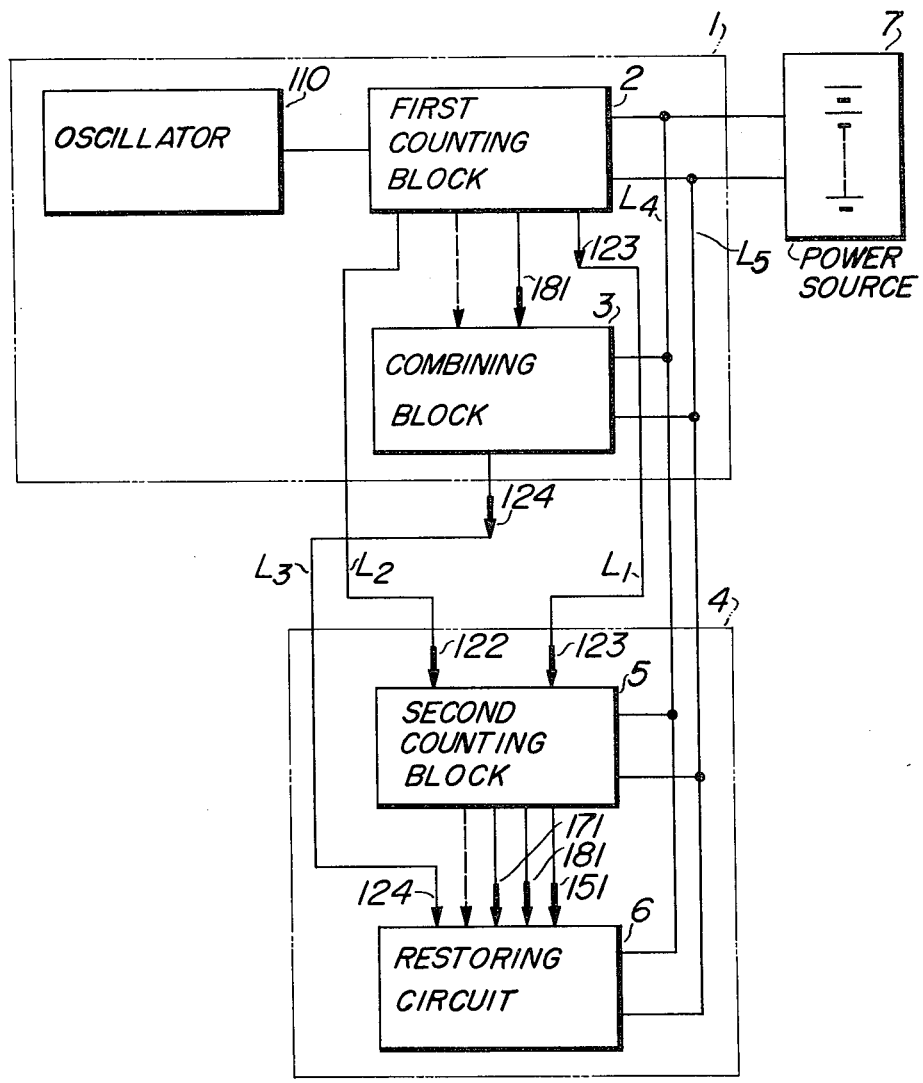
FIG. 1 is a schematic block diagram of the whole device according to the invention.
Figure 2:
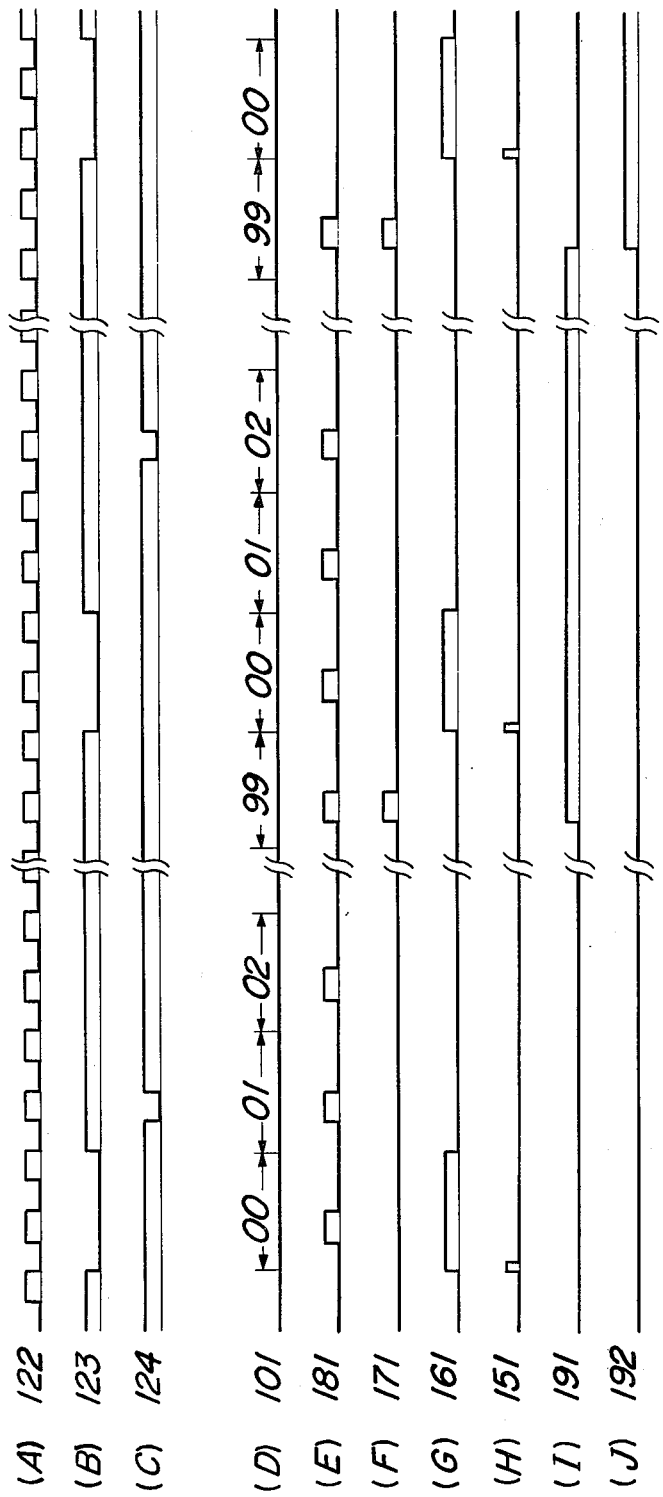
FIG. 2 shows waveforms necessary for the explanation of the operation of the time-sharing multiplex signal transmission system employed in the device according to the invention.

In FIG. 1, which shows a block diagram of the overall device according to the invention, a transmitter 1 is comprised of a first counting block 2, a combining block 3 and an oscillator 110, while a receiver 4 comprises a second counting block 5 and a restoring block 6. The power source 7 may be, for example, an accumulator. The general description of the time-sharing multiplex signal transmission system embodied in the multiplex signal transmission device according to the present invention, will now be described by reference to the waveforms shown in FIG. 2. The time base indicated at 101 in FIG. 2D is divided into equal periods, each comprising smaller intervals 00, 01, 02, 99, and signals to be transmitted to the receiving end are allotted to the intervals. The receiver discriminates whether the intervals contain the corresponding signals or not and picks up the predetermined ones of the signals only when they are contained in the respective intervals. This time sharing process is performed on the basis of a synchronous signal indicated at 123 in FIG. 2B and delivered from the first counting block 2 and a timing signal 122 indicated at 122 in FIG. 2A, through the provision of the scale-of-10 counters in the counting blocks 2 and 5 respectively of the transmitter 1 and the receiver 4. These scale-of-10 counters generate an address signal corresponding to the thus defined intervals, i.e. time-shared intervals. The signals to be transmitted are combined together through the combining block 3 to produce a level signal indicated at 124 in FIG. 2C, which is transmitted from the combining block 3. Therefore, the signal transmission between the transmitter 1 and the receiver 4 is through three lines, i.e. line $L_1$ for the synchronous signal, line $L_2$ for the timing signal and line $L_3$ for the level signal 124, while two additional lines $L_4$ and $L_5$ are provided therebetween for the purpose of power feeding. The synchronous signal 123 in which a period corresponding in time to the time-shared interval 00 has a lower level, is transmitted from the counting block 2 to the counting block 5. A reset signal 151 shown in FIG. 2H is obtained from a signal indicated at 161 in FIG. 2G in which a period corresponding to the time-shared interval 00 has a higher level. The reset signal 151 resets the frequency dividers and the scale-of-10 counters in the counting blocks 2 and 5. Each timeshared interval is superseded by the succeeding one every second period of the timing signal 122. Thus, the scale-of-10 counters provided in the counting blocks 2 and 5 are operated all in synchronism. The level signal 124 to be transmitted from the transmitter 1 to the receiver 4 is obtained by passing, i.e. taking a logical product (and logic) of, three signals; a predetermined input signal to be transmitted, an address signal from the scale-of-10 counter containing addresses indicative of the numeral-pairs (such as 02 or 04) of the time-shared intervals into which the input signal is allotted, and a strobe signal indicated at 181 in FIG. 2E; through an AND gate. The level signal 124 shows a case where a signal to be transmitted is superimposed on the addresses in the time-shared intervals indicated by the numeral-pairs 01 and 02. This level signal 124 is then restored through the restoring block 6 in the receiver 4 in the manner described below. The initial state is established by applying the reset signal 151 to the reset input of a first memory circuit during the time-shared interval 00. Then, an output signal which is the logical product (and logic) of the address signal appearing in the predetermined time-shared intervals and the level signal 124, is applied to the set input of the first memory circuit. Therefore, if an AND signal is applied to the set input the initial state of the memory circuit is cleared, while the initial state is maintained if there is no input to the memory circuit. Namely, the state of the first memory circuit is determined depending upon whether there is a level signal in respective timeshared intervals or not. The state is again cleared when the following time-shared interval 00 has been reached and it is necessary to transfer the content of the first memory to a second memory circuit before the former is cleared. This transfer operation is performed during the time-shared interval 99 by applying a transfer signal 171 shown in FIG. 2F, which is the logical product or AND of the interval 99 and the strobe signal 181 in FIG. 2E, to a gate which controls the transmission of the signal between the first and second memories. If in signal 124 a predetermined signal is in the interval 01 (or has a lower level in the interval), the content of the first memory is continuously fed to and stored in the second memory during the duration of a signal 191 shown in FIG. 2I from the time-shared interval 99 in a period to the interval 99 in the next period. If, on the other hand, in the signal 124 a predetermined signal is in the interval 02, the transfer of the content takes place in a similar manner, but during the duration of a signal 192 shown in FIG. 2J with a delay of one period with respect to the signal 191. Therefore, if in the level signal a predetermined signal appears in every interval 01, the signal 191 will last without interruption from the interval 99 shown in FIG. 2I onward.

Figure 3:
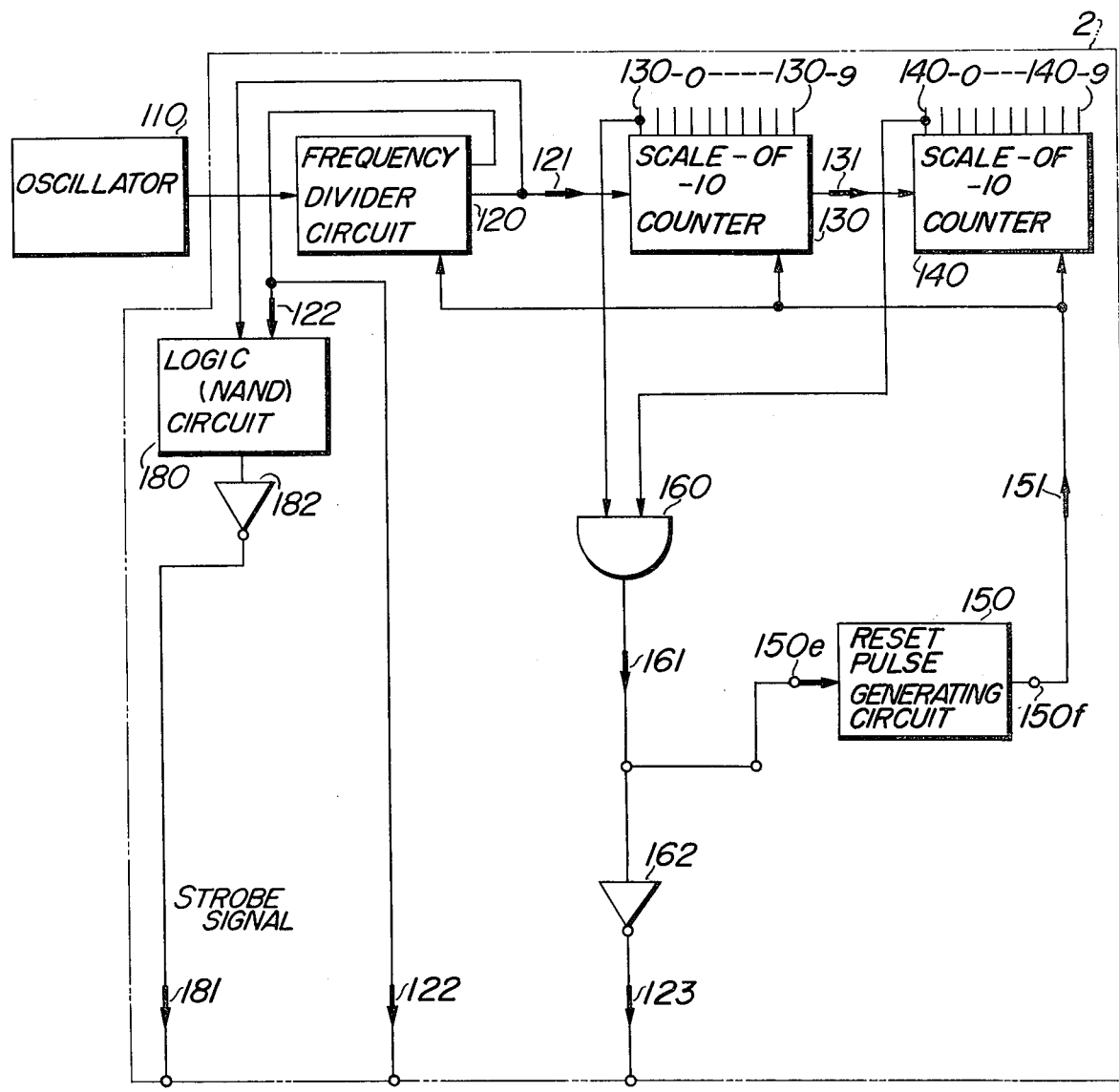
FIG. 3 is a block diagram showing the oscillator and counting blocks shown in FIG. 1.
Figure 4:
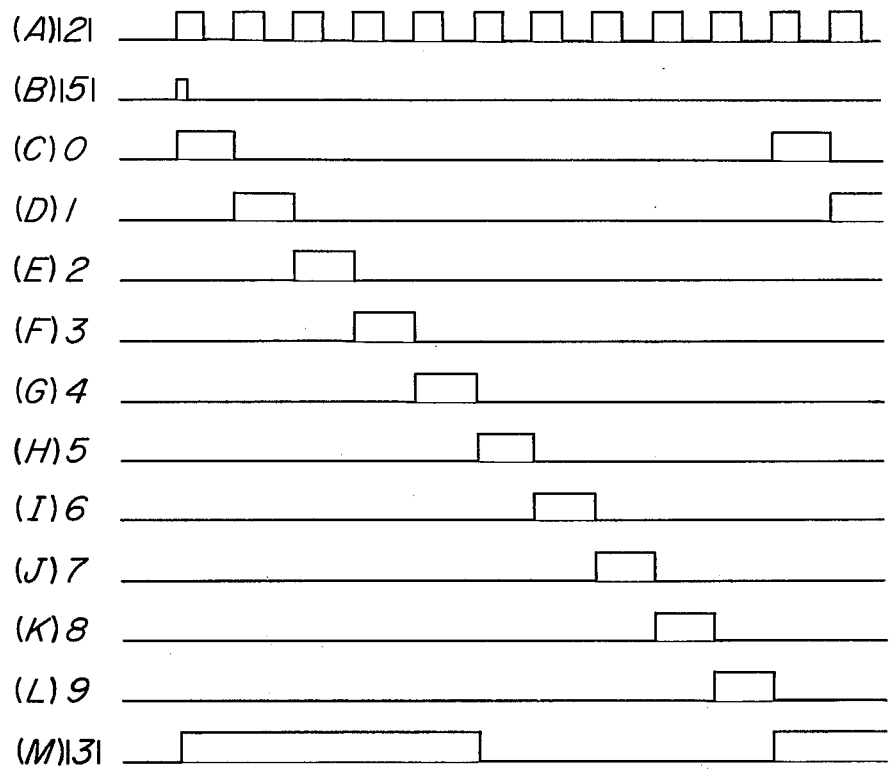
FIG. 4 shows waveforms illustrating the operational characteristic of a scale-of-10 counter used in the first block shown in FIG. 3.
Figure 5:
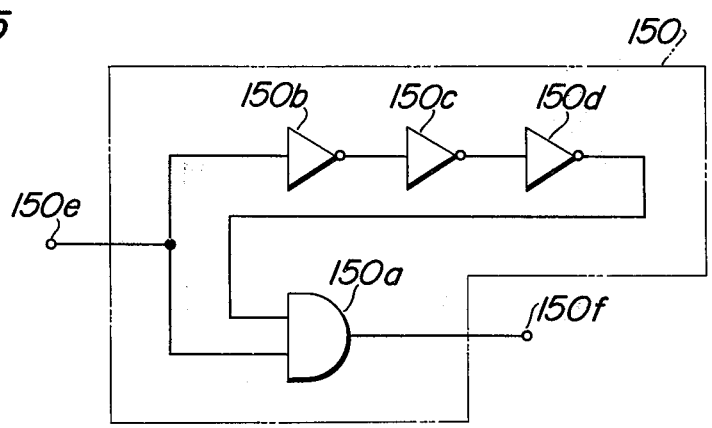
FIG. 5 is an electrical connection diagram of a circuit for generating reset pulses, shown in FIG. 3.
Figure 6:
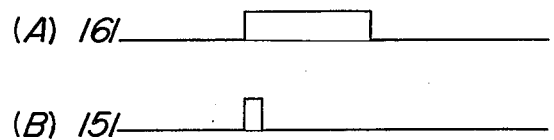
FIG. 6 shows waveforms illustrating the input and output characteristics of the reset pulse generating circuit shown in FIG. 5.

Now, the signal transmission according to the time-sharing system will be described with a detailed description of the circuit constitutions of the esssential blocks. FIG. 3 shows the constitutions of the oscillator 110 and the components of the first counting block 2 in the transmitter 1. The oscillator 110 may be comprised of a tuning fork, a quartz crystal oscillator or a capacitor-resistor compensated feedback arrangement. In the first counting block 2, the n-th output 121 and $(n-1)$th output 122 (timing signal shown in FIG. 2A) of the n-th stage of a frequency divider circuit 120 are applied to a logic circuit 180, which takes the NAND of the outputs The output of the NAND circuit 180 is then fed to an inverting gate 182, which in turn delivers the strobe signal 181. The strobe signal 181 is used to prevent the interference of the signals indicative of the time-shared intervals in transmission and reception. The logic circuit 180 may be substituted by an EXCLUSIVE OR circuit which takes the exclusive logic sum of the signals 121 and 122. When the EXCLUSIVE OR is used, the duration of said strobe signal becomes, in each of the durations defined by the addresses, equal to the interval from the time at the rise of the first pulse signal 122 to that of the second pulse. Although this duration becomes twice as long as that of the signal 181 shown in FIG. 2, a strobe signal whose duration is shorter than the duration defined by the address is generated. Thus, the use of the EXCLUSIVE OR does not give any adverse effect to the operation of the other circuits. Reference numerals 130 and 140 indicate scale-of-10 counters. The scale-of-10 counter 130 must be a device which delivers at its output terminals 130-0 to 130-9 output signals having waveforms as shown in FIG. 4. This requirement can be satisfied by using the well known MOS IC CD4017D manufactured by RCA or by a combination of suitable gates FIG. 4A shows an output signal 121 frequency divided by the frequency divider circuit 120. FIG. 4B shows a reset signal 151 which is an output of a reset pulse generating circuit 150 described below, FIGS. 4C to 4L show signals delivered respectively from the output terminals 130-0 to 130-9 of the scale-of-10 counter 130, and FIG. 4M shows an output signal 131 from the counter 130. The signal 131 from the counter 130 indicating the digit of the first place of the numeral-pair representing the time-shared interval, is applied to the scale-of-10 counter 140 which delivers an output signal indicating the digit of the second place of the same numeral-pair. The scale-of-10 counter 140 operates in the same manner as the counter 130. The signals derived respectively from the output terminals 130-0 and 140-0 of the counters 130 and 140 are fed to an AND gate 160, the output of which is then applied to an inverting gate 162 to obtain a synchronous signal 123 at its output terminal. The reset pulse generating circuit 150 receives the output signal 161 of the AND gate 160 as its input signal, and an embodiment of the circuit 150 is illustrated in FIG. 5. In FIG. 5, the reset pulse generating circuit 150 comprising an AND gate 150a, inverting gate 150b to 150d, an input terminal 150e and an output terminal 150f. When the output signal 161 of the AND gate 160 whose waveform is shown in FIG. 6A, is applied to the input terminal 150e, then at the output terminal 150f appears the reset signal 151 shown in FIG. 6B (identical with that shown in FIG. 2H). The reset signal as the output of the reset pulse generating circuit 150 is applied to the reset terminals of the frequency divider circuit 120 and the scale-of-10 counters 130. 140, respectively.

It is assumed in the following description that the frquency divider circuit 120 has a dividing factor equal to half a bit and that the ($n-1$)th output of the circuit 120, i.e. output of the oscillator 110, is used as the timing signal 122.

Figure 7:
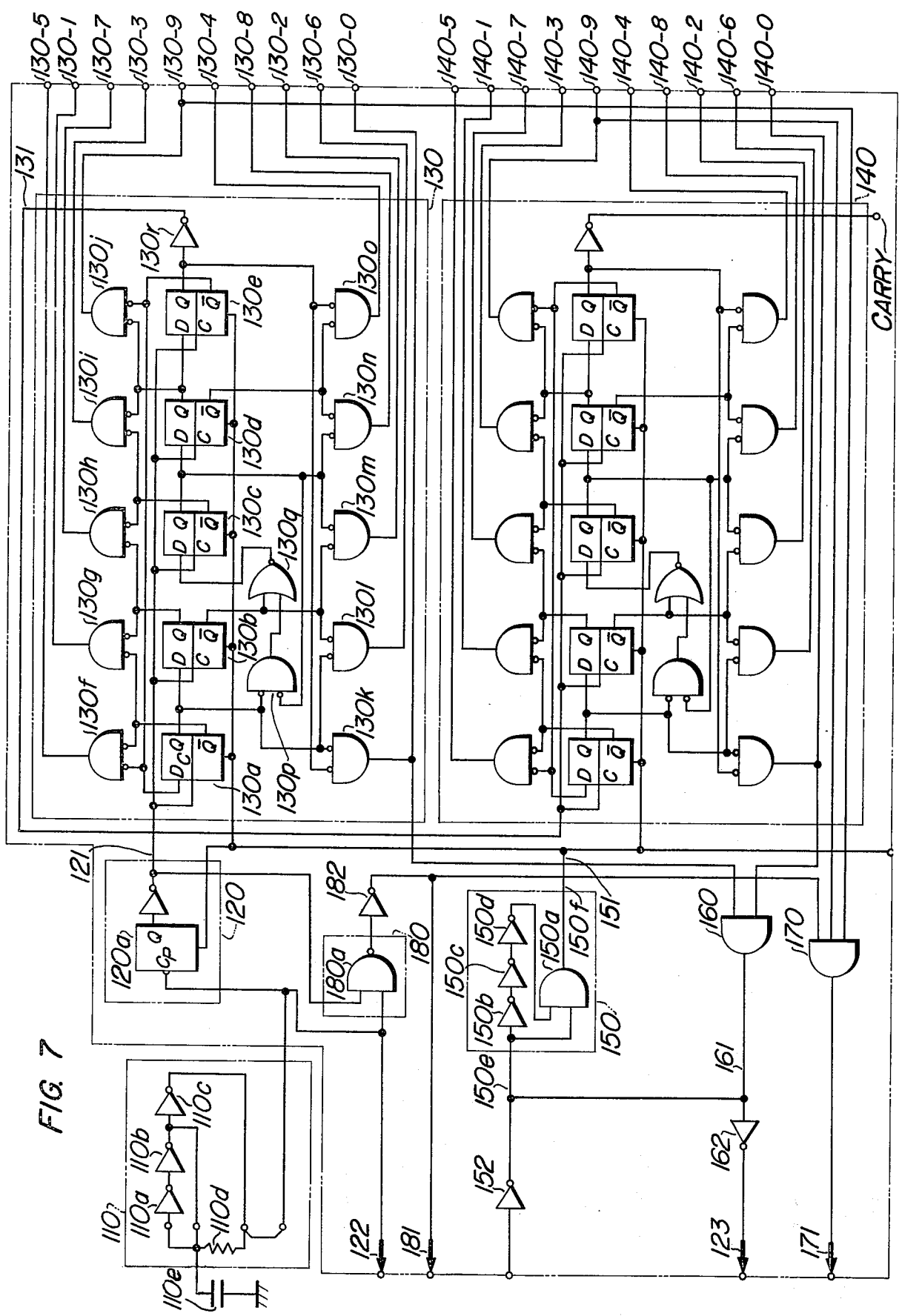
FIG. 7 is an electrical connection diagram showing in detail the internal circuit of the first counting block shown in FIG. 3.

FIG. 7 shows a concrete embodiment of a circuit shown in a block diagram in FIG. 3. In FIG. 7, the descriptions of the already mentioned circuit elements are abridged. The oscillator 110 has a well known constitution comprising inverting gates 110a, 110b and 110c, a resistor 110d and a capacitor 110e. The frequency divider 120 comprises a flipflop 120a and an inverting gate. The scale-of-10 counter 130 is the above-mentioned, well-known MOS IC CD4217D by RCA, which comprises D flipflops 130a to 130e, negative logic AND gates 130f to 130p, a NOR gate 130q and an inverting gate 130r. The scale-of-10 counter 140 has the same constitution and operates in the same manner as the counter 130. The logic circuit 180 is a NAND gate 180a. An AND gate 170 and an inverting gate 152 in the unit shown in FIG. 7 are useful only where the unit is used for the second counting block 5 in the receiver 4 but useless where the unit is used for the first counting block 2 in the transmitter 1. These elements are incorporated together with other circuit elements in a single IC unit or package and, therefore, if the unit is used for the first counting block 2 of the transmitter 1, the AND gate 170 and the inverting gate 152 are left out of electrical connection.

Figure 8:
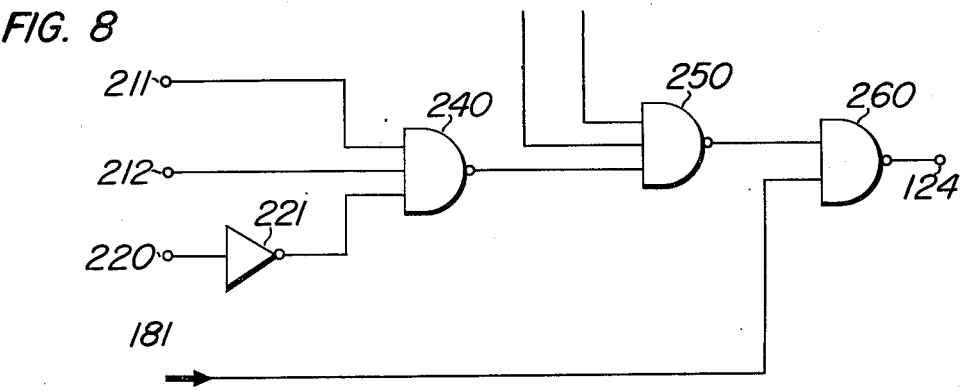
FIG. 8 is a block diagram of a part of a combining block shown in FIG. 1.
Figure 9:
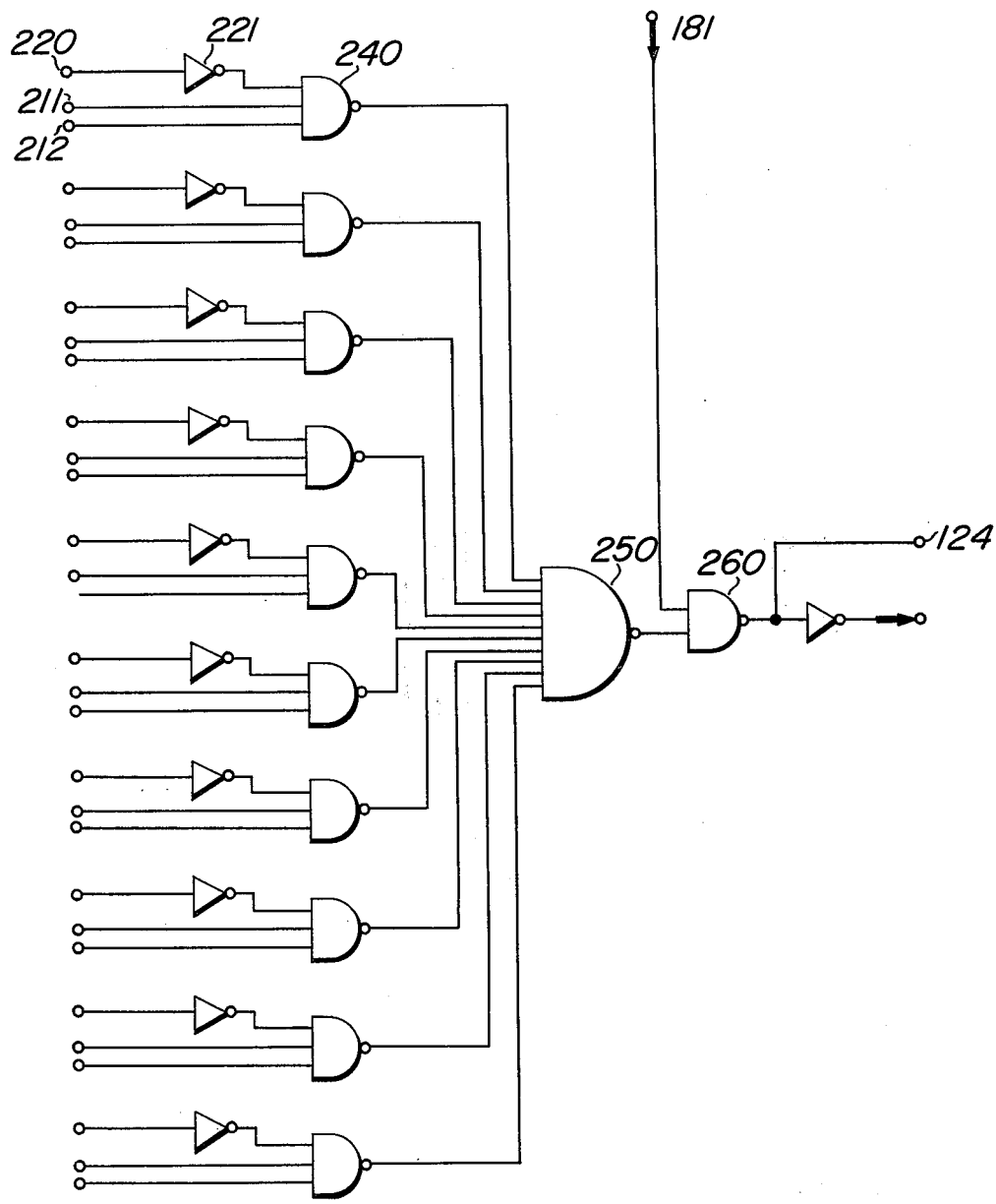
FIG. 9 is an electrical connection diagram of the whole combining block.

FIG. 8 shows a part of the combining block 3 of the transmitter 1, having a constitution for one channel associated with one address. The terminal 211 and 212 are connected respectively with the selected one of the terminals 130-0 to 130-9 of the scale-of-10 counter 130 and the selected one of the terminals 140-0 to 140-9 of the scale-of-10 counter 140 so as to obtain an address representative of a predetermined time-shared interval. For example, in order to obtain an address indicating the time-shared interval 13, it is only necessary to connect the terminal 211 with the output terminal 140-1 of the counter 140 asssociated with the digit of the second place of the numeral-pair representing the time-shared interval and the terminal 212 with the output terminal 130-3 of the counter 130 associated with the digit of the first place of the numeral-pair representing the time-shared interval. Such connections are represented for simplicity's sake by a dashed line in FIG. 1 connecting the first counting block 2 with the combining block 3. A terminal 220 is an input terminal which receives a signal transmitted from the transmitter 1 to the receiver 4 and an inverting gate 221 is provided to deliver the inversion of the input signal. The NAND gate 240 takes the NAND of the signals applied to the terminals 211 and 212 and the signal delivered from the inverting gate 221. Namely, the gate 240 delivers a lowleveled, "0" signal only when there are applied to the gate 240 a predetermined address signal and an input signal corresponding to the address. The output of the NAND gate 240 together with the outputs of the other NAND gates similar to the NAND gate which are associated with the other addresses, is applied to a NAND gate 250. This state is, for example, illustrated in FIG. 9. A NAND gate 260 takes the NAND of the output signal from the NAND gate 250 and the strobe signal 181 and delivers the level signal 124 to the line $L_3$. The combining block 3 shown in FIG. 9 is adapted for receiving ten inputs, i.e. ten channels, corresponding to ten addresses. However, if, as described later, the receiver 4 has eight input terminals, only eight channels out of ten are used for signal transmission. The selection of any address corresponding to each of the time-shared intervals 00 to 99 can be made by appropriately combining the outputs of the scale-of-10 counters 130 and 140. The number of channels for signal transmission in this embodiment is not limited to eight but may be increased up to 98, if need be, since there are ninety-eight time-shared intervals 01 to 98.

As described above, in signal transmission, any one of the addresses corresponding to the time-shared intervals 00 to 99 can be arbitrarily selected by means of the counting block 2 and the combining block 3.

Figure 10:
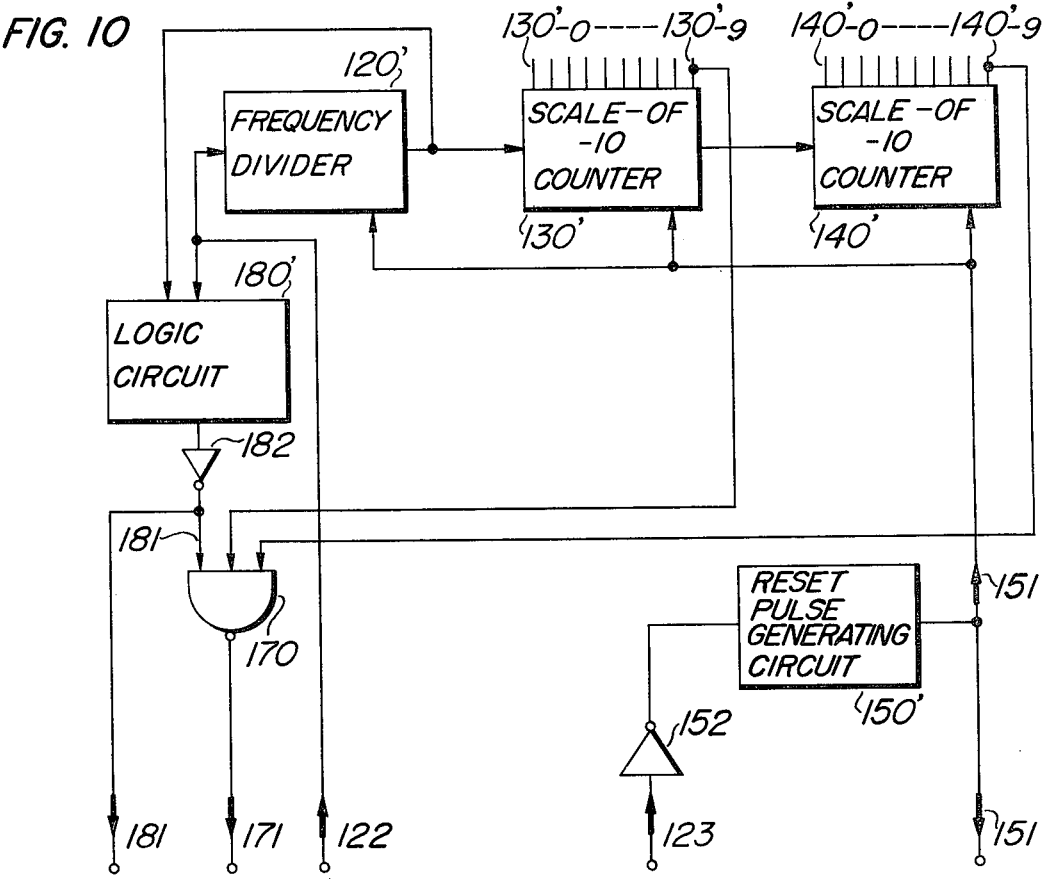
FIG. 10 is a block diagram of a second counting block shown in FIG. 1.

Now, the constitution and the operation of the receiver 4 will be described. The receiver 4 comprises the decoding block 6 and the second counting block 5 similar to the counting block 2 shown in FIG. 7 but with a somewhat different connection. FIG. 10 illustrates in detail the constitution of the counting block 5 for use in the receiver 4. The frequency divider circuit 120' is actuated by the timing signal 122 which is received from the first counting block 2 in the transmitter 1 through the line $L_2$. The reset pulse generating circuit 150' receives the output of an inverting gate 152 (see FIG. 7) which inverts the synchronous signal 123 fed through the line $L_1$. The signals appearing at the output terminal 130'-9 of a scale-of-10 counter 130' associated with the digit of the first place of the numeral-pair representing the time-shared interval and at the output terminal 140'-9 of a scale-of-10 counter 140' associated with the digit of the second place of the same numeral-pair, and the strobe signal 181 are applied to an AND gate 170 to produce the transfer signal 171. With the circuit configuration described above, the scale-of-10 counters 130' and 140' operate in synchronism with the transmitting end.

The circuit of the second counting block 5 in the receiver 4 is the same as that of the first counting block 2 in the transmitter 1 in FIG. 7, but the NAND gate 160 and the inverting gate 162 shown in FIG. 7 are unnecessary for the operation of the second counting block 5 and they are omitted in the circuit shown in FIG. 10. The frquency divider circuit 120', the scale-of-10 counters 130' and 140', the reset pulse generating circuit 150' and the logic circuit 180' of the second counting block 5 in the receiver 4 have the same constitutions and operate in the same manner as those of the first counting block 2 in the transmitter 1 in FIG. 7.

Figure 11:
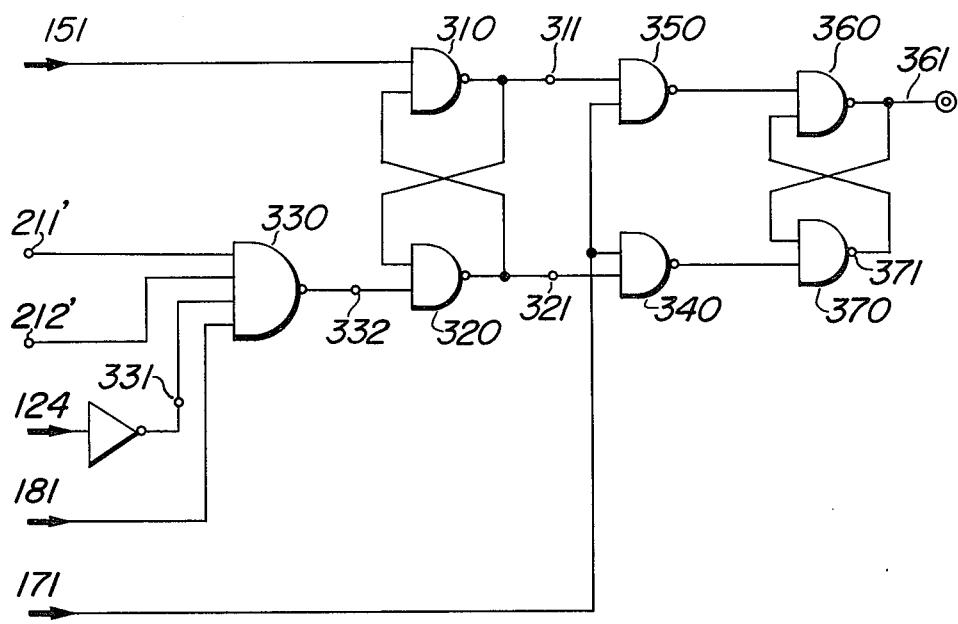
FIG. 11 is an electrical connection diagram of a part of a restoring block.

FIG. 11 shows the electrical connection of one of the constitutents, i.e. equivalent components, of the restoring block 6. NAND gates 310 and 320 form a set-reset type flipflop serving as a first memory circuit. NAND gates 360 and 370 also form a set-reset type flipflop serving as a second memory circuit. This unit receives the strobe signal 181 and the transfer signal 171 from the second counting block 5 shown in FIG. 10 and has terminals 211' and 212' which are adapted to receive an address signal represeenting a time-shared interval. For example, if the terminals 211' and 212' are connected respectively with the output terminal 140'-1 of the scale-of-10 counter 140 and the output terminal 130'-3 of the scale-of-10 counter 130', an address signal indicative of the time-shared interval 13 is introduced to the unit. These connections are represented for simplicity's sake by a dashed line between the second counting block 5 and the restoring block 6 in FIG. 1. The operation of the unit is as follows. The first memory circuit assumes its initial state upon reception of the reset signal 151 from the second counting block 5 to maintain the output terminal 311 at a higher level and the output terminal 321 at a lower level and this state continues after the reset signal 151 has ceased. If, for example, the address signal representing the interval 13 is applied from the counters 130' and 140' respectively to the terminals 211' and 212' while at the same time the level signal 124 applied to the unit through the line $L_3$ has the higher level allocated to the corresponding interval 13, then the terminal 331 is maintained at the higher level. If the strobe signal 181 assumes the higher level in response to the interval 13, the NAND gate 330 is enabled to maintain its output terminal 332 at the lower level. Accordingly, the state of the first memory circuit is changed so that the output terminals 321 and 311 are maintained respectively at the higher and lower level. And this state is maintained even after the time-shared interval 13 has passed away, since both the signal at the output terminal 332 and the reset signal 151 assume the higher level. The levels at the terminals 321 and 311 are transferred respectively to the NAND gates 370 and 360 forming the second memory circuit through the NAND gates 340 and 350 opened by the transfer signal 171 generated during the time-shared interval 99. Namely, the very signal appearing at the terminal 311 when the transfer signal 171 is on the point of being generated, appears at the output terminal 361. This is true also for the terminals 321 and 371. The state of the second memory circuit is maintained until the next pulse of the transfer signal 171 has arrived.

Figure 12:
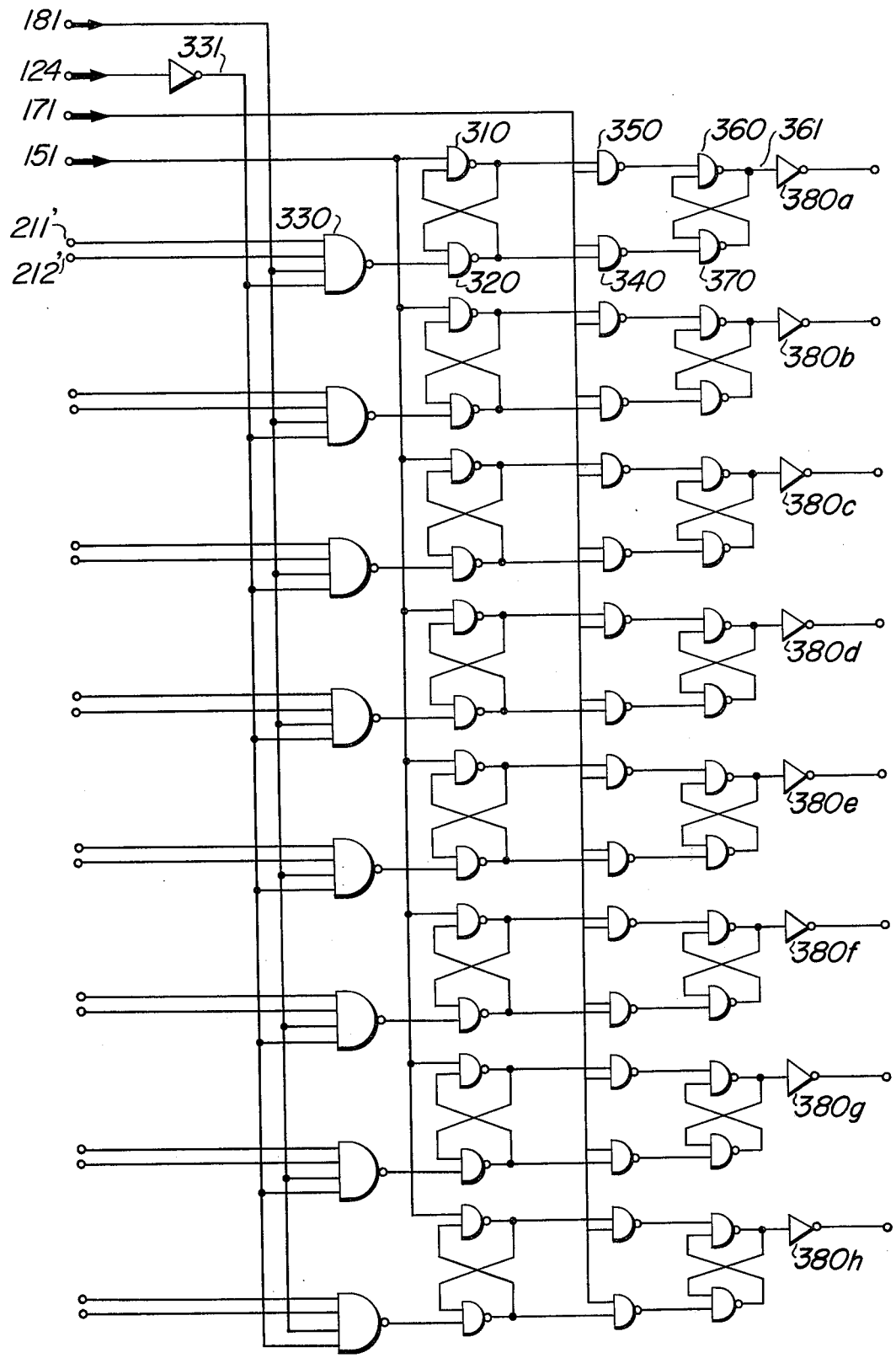
FIG. 12 is an electrical connection diagram of the whole restoring block shown in FIG. 1.

FIG. 12 illustrates in detail a decoding block comprising eight equivalent units, one of which is illustrated in FIG. 11. In the constitution of the restoring block shown in FIG. 12, the reset signal 151, the level signal 124, the strobe signal 181 and the transfer signal 174 are applied respectively with the input busses common to the eight units. Moreover, in order to improve the stability of the second memory circuit inverting gates 380a to 380h are additionally provided at the output terminals of the units.

Figure 13:
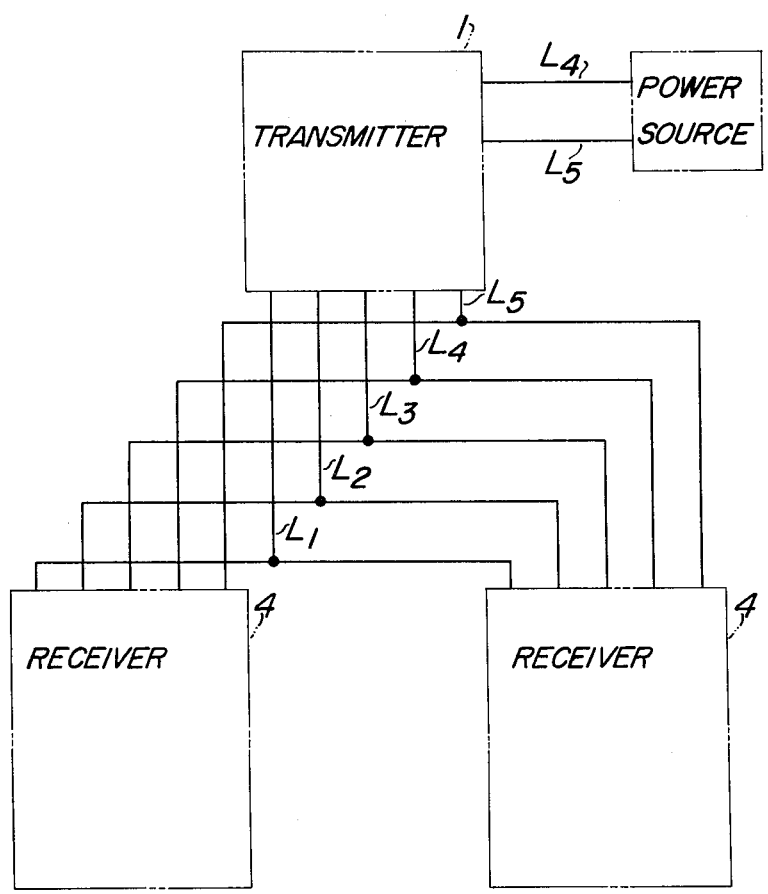
FIG. 13 is a block diagram of the multiplex signal transmission device according to the invention wherein two receivers are incorporated.

A plurality of receivers may be introduced in place of one and in this case the time-shared intervals in use have to be allocated appropriately to the plural receivers. FIG. 13 shows a case where two receivers are connected with one transmitter. This is usual, for example, with the application to an automobile in which it is required to controllably energize the front search light and the tail lamps by a manual switch actuated by the driver . In such a case, the transmitter is placed within the driver's reach and the two receivers are placed within the engine room and the trunk room and the wired OR method using DTL may be resorted to.

As is apparent froma the above description, since the first counting block has the same circuit configuration as the second counting block, there is also needed in this case only four kinds of blocks which are used for the above described multiplex signal transmission device comprising one transmitter and one receiver. If, in this case, the oscillator is incorporated in the counting block so that the oscillator is left unused when the block is used as the second counting block, then only three different blocks are needed. It should here be noted that the cost of an IC unit having in its circuit a portion which is used when the unit is used as the first counting block but not used when it serves as the second counting block, is almost the same as that of an IC unit which is fabricated to serve solely as the first counting block or the second counting block and that the former is more advantageous than the latter from the standpoint of interchangeability and mass-producibility. Further, if the circuit described above is completed in the MOS configuration, the consumed power will be much reduced so that an especially adapted battery can be employed as a power source so as to make possible signal transmission not suffering from the faults in the commercial supply system. Moreover, in the embodiment as described above, two scale-of-10 counters are used in either the transmitter or the receiver so that 98 effective addresses representing the corresponding time-shared intervals are available. If it is desired to increase the number of addresses, additional scale-of-10 counters together with additional units for the combining block and the restoring block have only to be provided in accordance with the increase in the number of the addresses.

I claim:

1. A time division multiplex signal transmission system for transmitting and receiving information signals from a plurality of channels in each of a succession of time frames, said system comprising in combination:

a transmitter, said transmitter including an oscillator for generating a pulse signal having a predetermined frequency; a first circuit means connected to said oscillator for generating a timing signal, a synchronous signal for synchronizing each frame of the transmitted signal and an address signal for defining each of a plurality of time intervals within said frames; and a combiner circuit connected to said first circuit means and to each of a plurality of channels containing information signals to be transmitted, said combiner circuit including means responsive to said address and information signals for generating a time division multiplex level signal, wherein said timing, synchronous and level signals are transmitted separately, and a receiver, said receiver including a second circuit means responsive to said transmitted timing and synchronous signals for generating a second address signal for defining each of the plurality of time intervals within said frames of said transmitted level signal, said second circuit means including a means for generating a transfer signal during the last time interval of each of said frames, a restoring circuit connected to said second circuit means, said restoring circuit including means responsive to said second address signal and said level signal for converting said level signal back to said plurality of information signals, and means for storing each of said information signals, wherein said means or storing comprises a first memory circuit for storing the converted information signal, said first memory circuit being reset in response to said transmitted synchronous signal, and a second memory circuit connected to said first memory circuit for storing the output information signal of said first memory circuit, wherein said output information signal is transferred from the first to the second memory circuit in response to the receipt of said generated transfer signal.

2. The time division multiplex signal transmission system of claim 1 wherein said first circuit means further comprises means for generating strobe pulses, one for each of said time intervals in said frames, wherein said pulses have a duration which is less than the duration of said time intervals and wherein the level signal generated by said combiner circuit has a duration in each time interval which is equal to that of said strobe signal.

3. The time division multiplex signal transmission system of claim 1 wherein said first circuit means further includes means or frequency dividing the pulse signal output of said oscillator to generate said timing signal and wherein the duration of each of said time intervals in said frames is twice the period of said timing signal.

4. The time division multiplex signal transmission system of claim 1 wherein said first circuit means includes scale-of-ten counters for generating said address signal.

5. A time division multiplex signal transmission system for transmitting and receiving information signals from a plurality of channels in each of a succession of time frames, said system comprising in combination, a transmitter, said transmitter including an oscillator for generating a pulse signal having a predetermined frequency; a first circuit means connected to said oscillator for generating a timing signal, a synchronous signal for synchronizing each frame of the transmitted signal, and an address signal for defining each of a plurality of time intervals within each of said frames, said first circuit means further including means for generating strobe pulses, one for each time interval within said frame, said strobe pulses having a duration which is less than the duration of said time intervals, and a combiner circuit connected to said first circuit means and to each of a plurality of channels containing information signals to be transmitted, said combiner circuit including means responsive to said address, information and strobe signals for generating a time division multiplex level signal having a duration in each of said time intervals equal to the time duration of said strobe pulses wherein said timing, synchronous and level signals are transmitted separately, and a receiver, said receiver including a second circuit means responsive to said transmitted timing and synchronous signals for generating a second address signal for defining each of said plurality of time intervals within said frame of said transmitted level signal, said second circuit means including a means for generating a transverse signal during the last time interval of each of said frames, a restoring circuit connected to said second circuit means, said restoring circuit including means responsive to second address signal and said level signal for converting said level signal back to said plurality of information signals, and means for storing each of said information signals, said means for storing said information signals comprising a first memory circuit for storing the converted information signal, said first memory circuit being reset in response to said transmitted synchronous signal, and a second memory circuit connected to said first memory circuit restoring the output information signal of said first memory circuit, wherein said output information signal is transferred from the first to the second memory circuit in response to the receipt of said generated transverse signal.

6. The time division multiplex signal transmission system of claim 5 wherein said first circuit means further include means for frequency dividing the pulse signal output of said oscillator to provide said timing signal and wherein the duration of each of said time intervals within said frames is equal to twice the period of said timing signal.

7. The time division multiplex signal transmission system of claim 5 wherein said means for generating said strobe pulses includes an AND logic circuit, said logic circuit being responsive to said timing signal for generating said strobe pulses.

8. The time division multiplex signal transmission system of claim 5 wherein said means for generating said strobe pulses incudes an EXCLUSIVE OR logic circuit, said logic circuit being responsive to said timing signal for generating said strobe pulses.

9. The time division multiplex signal transmission system of claim 5 wherein said first circuit means includes scale-of-ten counters for generating said address signal.

* * * * *